(12) United States Patent
Wang et al.

(10) Patent No.: US 11,741,343 B2
(45) Date of Patent: Aug. 29, 2023

(54) SOURCE SEPARATION METHOD, APPARATUS, AND NON-TRANSITORY COMPUTER-READABLE MEDIUM

(71) Applicant: National Central University, Taoyuan (TW)

(72) Inventors: Jia-Ching Wang, New Taipei (TW); Yao-Ting Wang, Taichung (TW)

(73) Assignee: National Central University, Taoyuan (TW)

( * ) Notice: Subject to any disclaimer, the term of this patent is extended or adjusted under 35 U.S.C. 154(b) by 829 days.

(21) Appl. No.: 16/697,209

(22) Filed: Nov. 27, 2019

(65) Prior Publication Data
US 2021/0142148 A1 May 13, 2021

(30) Foreign Application Priority Data
Nov. 7, 2019 (TW) ................. 108140473

(51) Int. Cl.
| G06N 3/045 | (2023.01) |
| G10L 21/0272 | (2013.01) |
| G06F 18/211 | (2023.01) |
| G06F 18/213 | (2023.01) |
| G06F 18/2415 | (2023.01) |

(52) U.S. Cl.
CPC ........... *G06N 3/045* (2023.01); *G06F 18/211* (2023.01); *G06F 18/213* (2023.01); *G06F 18/2415* (2023.01); *G10L 21/0272* (2013.01)

(58) Field of Classification Search
CPC ............. G10L 21/0272; G06K 9/6228; G06K 9/6232; G06K 9/6277; G06K 9/627; G06V 10/449; G06N 3/0454; G06N 3/045; G06F 18/211; G06F 18/213; G06F 18/2415; G06F 18/2413
See application file for complete search history.

(56) References Cited

U.S. PATENT DOCUMENTS

| 2018/0082107 A1 | 3/2018 | Li et al. |
| 2018/0260956 A1* | 9/2018 | Huang ................. G06V 10/764 |

(Continued)

FOREIGN PATENT DOCUMENTS

| TW | I305090 | 1/2009 |
| TW | I396186 | 5/2013 |

(Continued)

OTHER PUBLICATIONS

Daniel Stoller, et al., "Wave-U-Net: a Multi-Scale Neural Network for End-to-End Audio Source Separation," Proceedings of the 19th ISMIR Conference, Sep. 2018, pp. 334-340.

(Continued)

*Primary Examiner* — Michael N Opsasnick
(74) *Attorney, Agent, or Firm* — JCIPRNET

(57) ABSTRACT

A source separation method, an apparatus, and a non-transitory computer-readable medium are provided. Atrous Spatial Pyramid Pooling (ASPP) is used to reduce the number of parameters of a model and speed up computation. Conventional upsampling is replaced with a conversion between time and depth, and a receptive field preserving decoder is provided. In addition, temporal attention with dynamic convolution kernel is added, to further achieve lightweight and improve the effect of separation.

13 Claims, 6 Drawing Sheets

(56) References Cited

U.S. PATENT DOCUMENTS

| | | | | |
|---|---|---|---|---|
| 2019/0066713 A1* | 2/2019 | Mesgarani | .............. | G10L 17/26 |
| 2020/0036354 A1* | 1/2020 | Matsukawa | ............ | H03G 5/025 |
| 2020/0043517 A1* | 2/2020 | Jansson | .................... | G06N 3/08 |
| 2020/0202533 A1* | 6/2020 | Cohen | ..................... | G06V 10/25 |
| 2020/0342234 A1* | 10/2020 | Gan | ....................... | G06V 10/82 |
| 2020/0395036 A1* | 12/2020 | Kameoka | ................ | G10L 25/30 |

FOREIGN PATENT DOCUMENTS

| | | |
|---|---|---|
| TW | I455115 | 10/2014 |
| TW | I473077 | 2/2015 |
| TW | 201710949 | 3/2017 |
| TW | I651927 | 2/2019 |

OTHER PUBLICATIONS

Liang-Chieh Chen, et al., "Encoder-Decoder with Atrous Separable Convolution for Semantic Image Segmentation," European Conference on Computer Vision, Feb. 2018, pp. 833-851.

Sanghyun Woo, et al., "CBAM: Convolutional Block Attention Module," European Conference on Computer Vision, Jul. 2018, pp. 1-17.

* cited by examiner

SOURCE SEPARATION METHOD, APPARATUS, AND NON-TRANSITORY COMPUTER-READABLE MEDIUM

CROSS-REFERENCE TO RELATED APPLICATION

This application claims the priority benefit of Taiwan application serial no. 108140473, filed on Nov. 7, 2019. The entirety of the above-mentioned patent application is hereby incorporated by reference herein and made a part of this specification.

BACKGROUND

Technical Field

The disclosure relates to a machine learning technology, and in particular, to a source separation method, an apparatus, and a non-transitory computer-readable medium based on machine learning.

Description of Related Art

With machine learning technologies, operation rules may be learned and derived from existing data and experiences, and machine learning is deemed an important sub-field of artificial intelligence. There has been a quite extensive range of fields where machine learning plays a role. In the field of multimedia signal processing, the Deep Neural Network (DNN) has been developed rapidly. Specifically, regarding music source separation, in the conventional art, spectrum information may be firstly formed through Short Time Fourier Transform (STFT), and then the real number portion in the spectrum information (e.g., magnitude of an absolute value) is obtained as the input value of the DNN. Then, time-frequency data of a signal to be separated is obtained through a trained deep learning neural network, and finally, inverse Short Time Fourier Transform (iSTFT) is performed to convert the signal to time domain.

Although directly processing mixed signals as input data in the time domain helps alleviate the deficiency of not taking phase into consideration in the conventional art, the entire model relies on a large number parameters to achieve the desired effect, and thus issues such as an excessive size of model, a significant delay, poor computation efficiency, etc. may possibly arise.

SUMMARY

In view of the above issues, the disclosure provides a source separation method, an apparatus, and a non-transitory computer-readable medium, in which space-depth conversion replaces the traditional upsampling, and a receptive field preserving decoder is provided.

A source separation method of an embodiment of the disclosure is suitable for machine learning, and the source separation method includes: obtaining a one-dimensional signal, wherein the one-dimensional signal is generated by at least one source; encoding the one-dimensional signal in levels to form a plurality of encoded signals, wherein the encoded signal output by an encoding block of each level serves as an input of the encoding block of a next level, and the encoded signals output by the encoding blocks of different levels have different lengths; and decoding the encoded signals in levels to obtain a signal generated by at least one source to be separated in the at least one source, where the encoded signal of a low level is subjected to time-to-depth conversion to form a multi-dimensional signal having the same length as a decoded signal of a high level, the high level corresponding to the encoding block of a next level of the low level, and the multi-dimensional signal of the low level and the decoded signal of the high level are combined to preserve a receptive field and perform a decoding operation, the decoded signal being an output or input of the decoding operation.

A source separation apparatus of an embodiment of the disclosure is suitable for machine learning, and includes a memory and a processor. The memory is configured to record a code. The processor is coupled to the memory, and loads the code to perform: obtaining a one-dimensional signal, wherein the one-dimensional signal is generated by at least one source; encoding the one-dimensional signal in levels to form a plurality of encoded signals, wherein the encoded signal output by an encoding block of each level serves as an input of the encoding block of a next level, and the encoded signals output by the encoding blocks of different levels have different lengths; and decoding the encoded signals in levels to obtain a signal generated by at least one source to be separated in the at least one source, where the encoded signal of a low level is subjected to time-to-depth conversion to form a multi-dimensional signal having the same length as a decoded signal of a high level, the high level corresponding to the encoding block of a next level of the low level, and; and the multi-dimensional signal of the low level and the decoded signal of the high level are combined to preserve a receptive field and perform a decoding operation, the decoded signal being an output or input of the decoding operation.

A non-transitory computer-readable medium of an embodiment of the disclosure records a code that is loaded and executed by a processor to perform the aforementioned source separation method.

Based on the above, the source separation method, the apparatus and the non-transitory computer-readable medium of the embodiments of the disclosure provide a receptive field preserving decoder to further improve the effect of separation when the input time scale is limited. In addition, the embodiments of the disclosure further reduce the number of parameters of a model and speed up the computation by adopting Atrous Spatial Pyramid Pooling (ASPP), and incorporate temporal attention with dynamic convolution kernel.

To make the features and advantages of the disclosure clear and easy to understand, the following gives a detailed description of embodiments with reference to accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
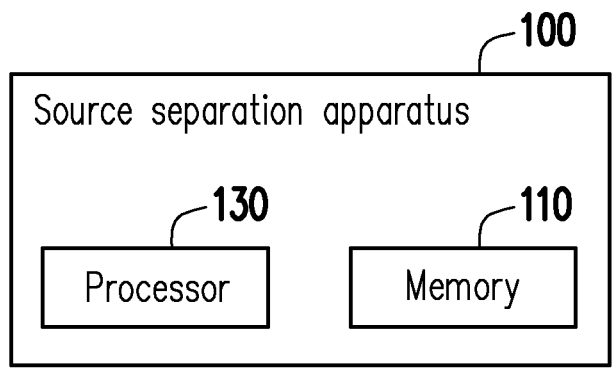
FIG. 1 is a component block diagram of a source separation apparatus according to an embodiment of the disclosure.

FIG. 1 is a component block diagram of a source separation apparatus 100 according to an embodiment of the disclosure. Referring to FIG. 1, the source separation apparatus 100 includes, but is not limited to, a memory 110 and a processor 130. The source separation apparatus 100 may be an electronic apparatus such as a mobile phone, a tablet computer, a desktop computer, a server, or a smart speaker.

The memory 110 may be any type of memory such as a fixed or mobile Random Access Memory (RAM), a Read-Only Memory (ROM), a flash memory, a Hard Disk Drive (HDD), a Solid-State Drive (SSD) or similar components or a combination of the above components. In the embodiment of the disclosure, the memory 110 is configured to store temporary or permanent data (e.g., a one-dimensional signal, a weight of a convolution kernel, an encoded signal, a multi-dimensional signal, a decoded signal, a mask, etc.), a software module, or other files and data, and the details thereof will be described in the following embodiments.

The processor 130 is coupled to the memory 110. The processor 130 may be a Central Processing Unit (CPU), or other programmable general purpose or special purpose microprocessors, a Digital Signal Processor (DSP), a programmable controller, an Application-Specific Integrated Circuit (ASIC) or other similar components or a combination of the above components. In the embodiment of the disclosure, the processor 130 is configured to perform all operations of the source separation apparatus 100, and may load and execute various software modules, files and data recorded by the memory 110.

In order to facilitate the understanding of the operation process of the embodiment of the disclosure, a source separation process for a one-dimensional signal in the embodiment of the disclosure will be described in detail below with a plurality of embodiments. Hereinafter, a method described in an embodiment of the disclosure will be described in conjunction with each component and module in the source separation apparatus 100. The various processes of the method may be adjusted accordingly depending on an implementation situation, and are not limited thereto.

Figure 2:
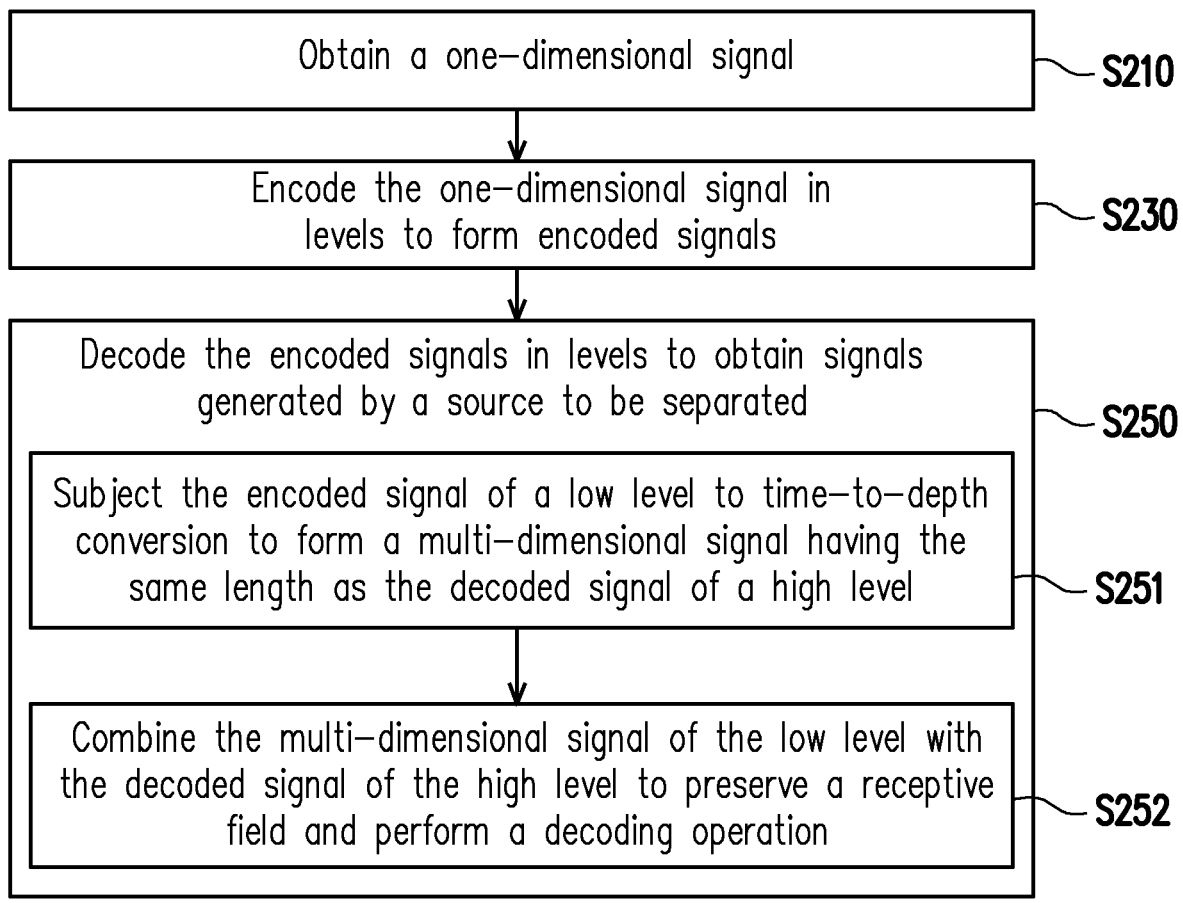
FIG. 2 is a flow chart of a source separation method according to an embodiment of the disclosure.

FIG. 2 is a flow chart of a source separation method according to an embodiment of the disclosure. Referring to FIG. 2, after the processor 130 obtains a one-dimensional signal through recording with a microphone, capturing a packet from a network, uploading such signal by a user, or via an external or built-in storage medium (e.g., a flash drive, a compact disc, an external hard drive, etc.) (step S210), the one-dimensional signal may be stored in the memory 110. The one-dimensional signal is, for example, a one-dimensional sound, image, code, or signal of any type. It is worth noting that the one-dimensional signal of the embodiment of the disclosure is generated by one or more sources. For example, the one-dimensional signal is related to a sound recorded during the performance of a band, and may include signals produced by a plurality of sound sources such as vocals, drums, guitars, or keyboards. It should be noted that the source is not limited to the sound sources, and the source may be other types of signal generators.

Then, the processor 130 encodes the one-dimensional signal in levels to form one or more encoded signals (step S230). Specifically, there are mainly two types of methods for separating sound sources by using a convolutional neural network. One is to use a Temporal Convolutional Network (TCN) (e.g., Conv-TasNet), which may handle dialog separation issues. The other is to use a Fully Convolutional Network (FCN) as the main structure, or use its variants (e.g., U-Net) to supplement information at the low level as a reference in a decoding stage, so as to more favorably restore an image edge or signal details. In a music source separation task of a Signal Separation Evaluation Campaign (SiSEC) 2018, it can be seen that many methods adopt such an encoder-decoder framework.

It is worth noting that the inspiration for Wave-U-Net is inspired from applying U-Net to separate human sounds and music. The difference therebetween is mainly that Wave-U-Net uses a one-dimensional convolution instead of a two-dimensional convolution, and uses time domain information or time-frequency domain information as an input directly. In an embodiment, the embodiment of the disclosure uses Wave-U-Net as a reference for an infrastructure. In an encoder stage of Wave-U-Net, downsampling is used to calculate more features at the high level on a coarser time scale. The downsampling method here is different from the pooling commonly seen in the conventional convolutional neural networks. Specifically, the method includes directly decimating half of time scale features, i.e., retaining only eigenvectors of odd or even indexes. Meanwhile, in a decoder stage, although many related methods use transposed convolutions to upsample a feature map, the methods may be modified by firstly amplifying the feature map by nearest-neighbor interpolation or bilinear interpolation and then transmitting the amplified feature map to a general convolution layer.

In addition, Spatial Pyramid Pooling (SPP) has begun to be more widely used in the field of semantic segmentation, such as PSPNet or DeepLab. The DeepLabv3+ model, which the most recent one under the DeepLab framework, may integrate the encoder-decoder framework with ASPP to obtain a better effect of semantic segmentation, and may also serve as reference for the infrastructure of the embodiment of the disclosure.

Figure 3:
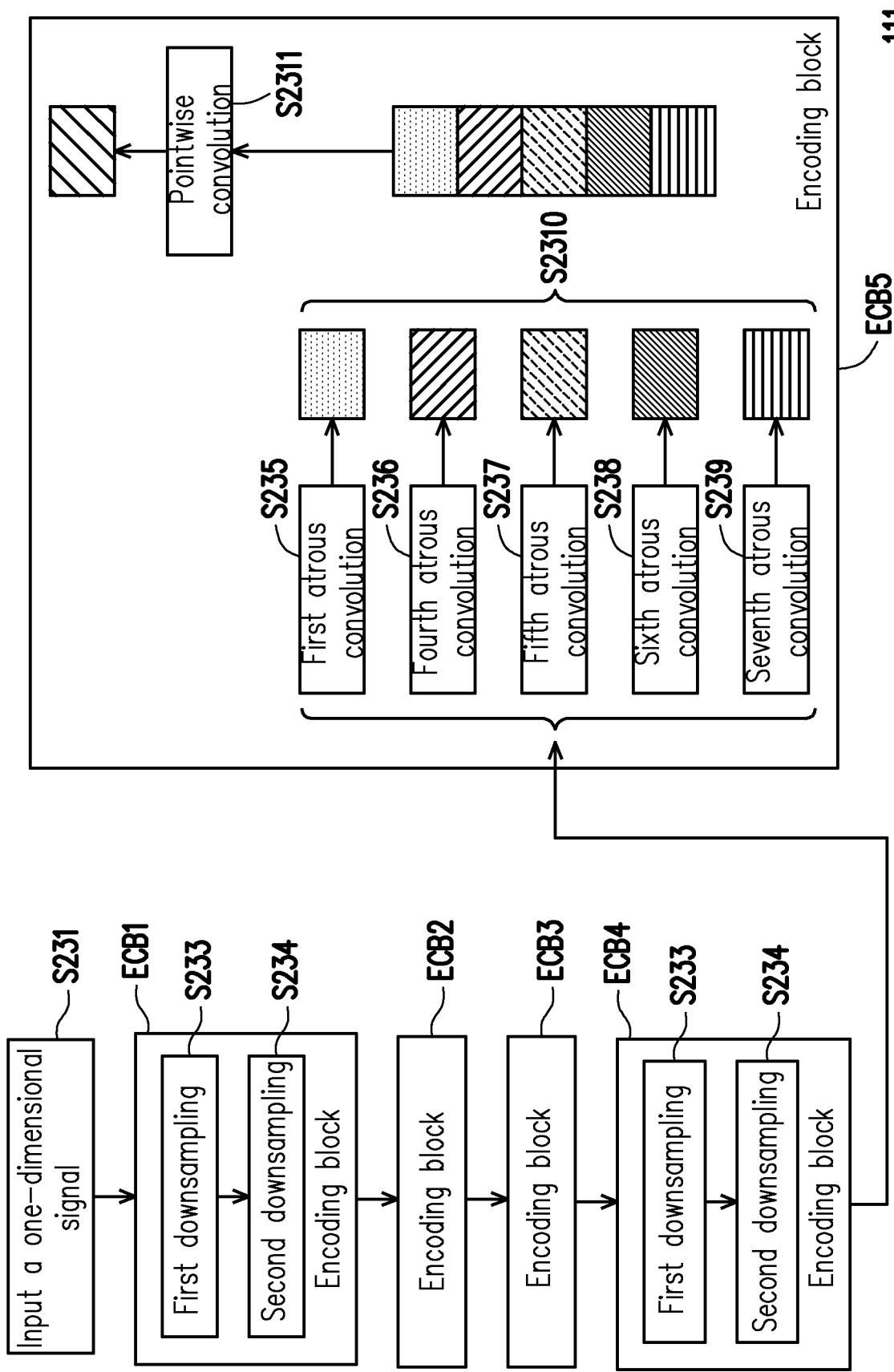
FIG. 3 is a schematic flow chart of an encoding module according to an embodiment of the disclosure.

FIG. 3 is a schematic flow chart of an encoding module 111 according to an embodiment of the disclosure. It should be noted that the modules mentioned below are all software modules recorded in the memory 110. Referring to FIG. 3, the encoding module 111 firstly inputs the one-dimensional signal obtained in step S210 (step S231). Then, the one-dimensional signal may be encoded in levels through five encoding blocks ECB1-ECB5. The encoded signal output by each of the encoding blocks ECB1-ECB4 serves as an input of the encoding block (one of the encoding blocks ECB2-ECB5) in a next level (here, the encoded signals are defined as output signals encoded by the encoding blocks ECB1-ECB5).

In an embodiment, the encoding blocks ECB1-ECB4 are downsampling blocks, and input signals are downsampled in the downsampling blocks respectively according to the one-dimension-per-layer standard or separable convolution, and a one-dimensional depth separable convolution having a one-level stride greater than one (first and second downsampling (step S233 and S234)). For example, the one-dimensional signal input for the first time has 1×16384 input features, and is subjected to downsampling respectively by a one-dimensional standard convolution having a length of 15 and a one-dimensional depth separable convolution having a length of 5 and a stride of 2, so as to obtain a 1×8194 encoded signal having 24 channels.

It should be noted that downsampling with a depth separable convolution allows to calculate more features of the high level on a coarser time scale. If a severe information loss is taken into consideration, the standard convolution may be used in some of the encoding blocks, and the depth separable convolution may be used in the other encoding blocks, but the embodiment of the disclosure is not limited thereto. For example, the standard convolution may be used for the encoding blocks ECB1-ECB3, and the depth separable convolution may be used for the encoding block ECB4.

Figure 4:
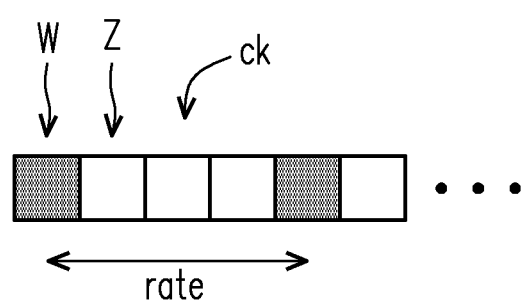
FIG. 4 is a schematic diagram of a convolution according to an embodiment of the disclosure.

In an embodiment, the encoding module 110 performs, in the encoding blocks of one or more levels, ASPP processing on each channel in the encoded signal output by the encoding block of the previous level. Specifically, the embodiment of the disclosure uses the atrous convolution together with various extension rates. For example, different extension rates are respectively used in the first to fifth atrous convolutions of the encoding block ECB5 (steps S236 to S239). As another example, the extension rates are 0, 4, 8, 16, and 32, respectively, but the disclosure is not limited thereto. FIG. 4 is a schematic diagram of an atrous convolution according to an embodiment of the disclosure. Referring to FIG. 4, it is assumed that the extension rate is 4. After a convolution kernel ck is extended, its weight W is filled with zero Z. Finally, the encoding module 110 reconnects the feature maps in series (step S2310) to integrate information by pointwise convolution (step S2311).

The use of ASPP not only reduces the number of encoding layers, i.e., preventing a feature map channel needing to be processed from being too deep, but also helps obtain a sufficiently large receptive field, so that the effect of separation is not excessively reduced. For example, the input one-dimensional signal has 16384 sampling points in a mixed audio, and after feature extraction by the downsampling block for four times, the time scale is changed to 1024. On such time scale, the features are extracted by using a convolution kernel having an extension rate of 32, an atrous convolution having a size of 15. The effective size is 449, which is close to a half of the existing time scale of 1024.

It should be noted that the number and size of the extension rates of the atrous convolution may be changed according to actual needs, and are not limited in the embodiment of the disclosure. In addition, there may be other variations in the number and convolution pattern of the aforementioned encoding blocks.

Figure 5:
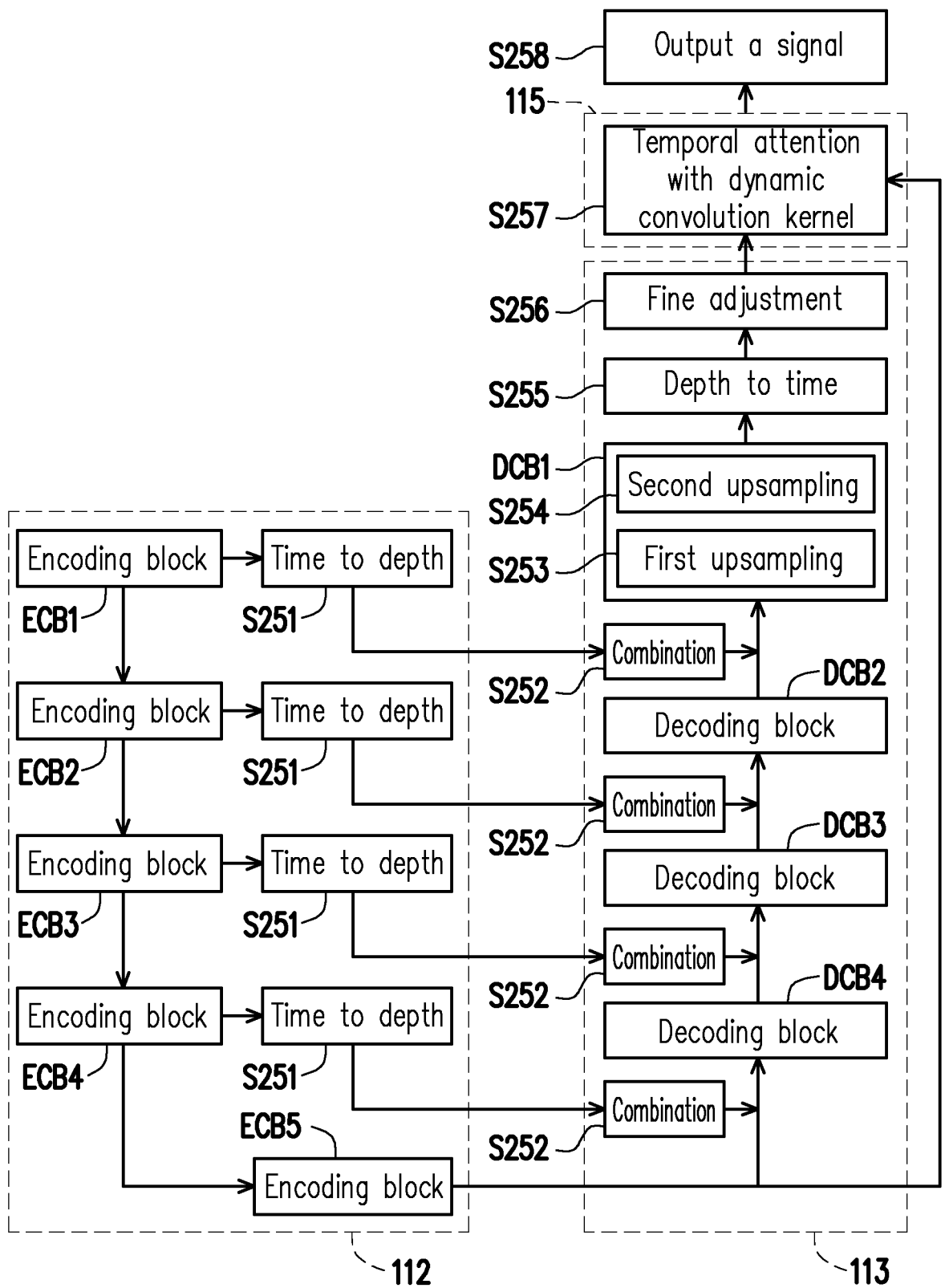
FIG. 5 is a schematic flow chart of an overall framework according to an embodiment of the disclosure.

After the encoding is completed, the processor 130 decodes the encoded signals in levels to obtain signals generated by one or more sources to be separated from the sources (step S250). Specifically, FIG. 5 is a schematic flow chart of an overall framework according to an embodiment of the disclosure. Referring to FIG. 5, in the decoding stage (implemented by a decoding module 113), after a space or time scale is amplified by using a nearest neighbor interpolation or a bilinear interpolation, the space or time scale is transmitted into a conventional convolution layer. Considering the case of the nearest neighbor interpolation which can be carried out more quickly in practice, the operation thereof roughly includes assuming that an input feature at the low level is $X^{LF}$, an input feature at the high level is $X^{HF}$, and an input feature of a series connection therebetween is $X^{US}$. It is considered that an input feature at a $t^{th}$ position may actually be divided into input features $X_t^{LF}$, $X_{t+1}^{LF}$, $X_t^{HF}$ and $X_t^{HF}$, where the input feature $X_t^{HF}$ is duplicated once because of the nearest neighbor interpolation, and a feature map combining the four vectors is represented by $X_{t,t+1}^{US}$, and an output feature $O_{t,i}^{US}$ of an $i^{th}$ convolution kernel is:

$$O_{t,i}^{US} = X_{t,t+1}^{US} \cdot (W_i^{US})^T \quad (1),$$

wherein the convolution kernel $W_i^{US}$ may be split into four parts: partial weights $W_i^{LF1}$, $W_i^{LF2}$, $W_i^{HF1}$, and $W_i^{HF2}$. The four partial weights may replace the convolution kernel $W_i^{US}$ in Formula (1) to derive Formula (2):

$$O_{t,i}^{US} = X_t^{LF} \cdot (W_i^{LF1})^T + X_{t+1}^{LF} \cdot (W_i^{LF2})^T + X_t^{HF} \cdot (W_i^{HF1})^T + W_i^{HF2})^T \quad (2)$$

Then, the partial weights $W_i^{HF1}$ and $W_i^{HF2}$ are merged into a partial weight $W_i^{HF}$ to derive Formula (3):

$$O_{t,i}^{US} = X_t^{LF} \cdot (W_i^{LF1})^T + X_{t+1}^{LF} \cdot (W_i^{LF2})^T + X_t^{HF} \cdot (W_i^{HF})^T \quad (3)$$

It should be noted that the weights are all learnable. In addition, the decoding module 113 utilizes space-to-depth conversion in a super-resolution method, which should be called time-to-depth in time series. The encoding module 112 may subject the encoded signal at a low level to the time-to-depth conversion to form a multi-dimensional signal having the same length as the decoded signal of a high level (step S251), and the decoding module 113 combines the multi-dimensional signal at the low level and the decoded signal at the high level to preserve the receptive field and perform a decoding operation (step S253). Specifically, the high level corresponds to the encoding block of the next level of the low level, and the decoded signal is an output or input of the decoding operation. Taking FIG. 5 as an example, the encoded signal output by the encoding block ECB4 (fourth level, corresponding to the low level) is subjected to a time-to-depth conversion (step S251) and then combined with the encoded signal (a decoded signal to be input by a decoding block DCB4) output by the encoding block ECB5 of the next level (fifth level, corresponding to the high level) (step S252), and a decoding operation is further performed by taking the result of combination as the input of the decoding block DCB4.

Figure 6:
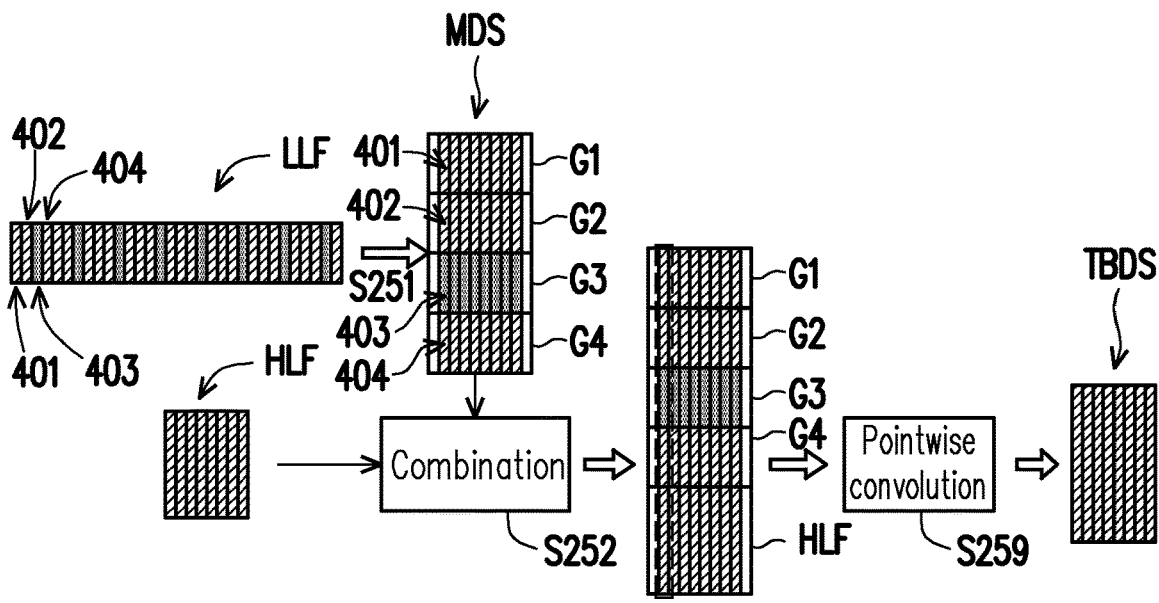
FIG. 6 is a schematic flow chart of time to depth according to an embodiment of the disclosure.

FIG. 6 is a schematic flow chart of time to depth according to an embodiment of the disclosure. Referring to FIG. 6, the processor 130 may equally divide a channel (one of the channels is taken as an example for reference of others) in an encoded signal LLF output by the encoding block of the low level into a plurality of signal groups. For example, input features 401-404 are grouped into the same signal group. The processor 130 sequentially combines input features at the same position in the signal groups into a plurality of one-dimensional second encoded signals G1-G4. For example, the first position of one of the aforementioned signal groups is the input feature 401 and belongs to the first encoded signal G1, the second position is the input feature 402 and belongs to the second encoded signal G2, and the first position of the next signal group is arranged at the second position of the second encoded signal G2, and so on. At this time, the time scale of the second encoded signals G1-G4 is the same as a decoded signal HLF of the high level. The processor 130 then combines the second encoded signals G1-G4 to form a multi-dimensional signal MDS (step S251). As shown, the combination is to connect in series to form a two-dimensional signal having a depth of 4. Then, the processor 130 may combine the multi-dimensional signal MDS with the decoded signal HLF. At this time, a two-dimensional signal having a depth of 5 is formed, and pointwise convolution is further performed (step S259), thereby forming a signal to be encoded TBDS (which may be input to the encoding block DCB1, DCB2, DCB3 or DCB4). Whereby, the time scale of the features of the high level is still preserved, that is, the receptive field is preserved.

It should be noted that the number of the groups shown in FIG. 6 may be different depending on the time scales of the encoded signal LLF and the decoded signal HLF. The embodiment of the disclosure does not intend to impose a limitation on this regard.

Referring to FIG. 5, the encoded signal output by the encoding block ECB5 is encoded in levels through the four decoding blocks DCB1-DCB4. In addition, the inputs of the decoding blocks DCB1-DCB4 may be as shown in the results of combination of FIG. 6. Decoded signals output by the decoding blocks DCB1-DCB3 of the respective levels respectively serve as the inputs of the decoding blocks DCB2-DCB4 of the next levels (the decoded signals are defined as output signals obtained by decoding through the decoding blocks DCB1-DCB4 or signals input to the decoding block DCB1 herein).

In an embodiment, the decoding blocks DCB1-DCB4 are upsampling blocks, and input signals are upsampled in the upsampling blocks respectively according to a one-dimension-per-layer standard convolution having a size of one, and a one-dimension-per-layer separable convolution having a size of 5 (first and second upsampling (steps S253 and S254)).

It is worth noting that as the upsampling continues, the time resolution continues to increase, and the receptive field of the convolution kernels of the same size continues to decrease. However, the embodiment of the disclosure provides a receptive field preserving decoder. During the decoding process, the depth-to-time conversion is not performed, but the time scale is matched by keeping performing the time-to-depth conversion, and the number of channels of output features is increased (as shown in FIG. 6). In this way, the receptive field may be preserved in the same size during the decoding process, the information lost due to downsampling can be favorably supplemented, thereby helping restore signal details.

Then, the decoding module 113 subjects the decoded signal output by the decoding block of one or more levels to the depth-to-time conversion (step S255) to form a second decoded signal having the same length as the one-dimensional signal. Taking FIG. 5 as an example, the decoding module 113 performs the depth-to-time conversion on the decoding block DCB1 of the lowest level. Then, the decoding module 113 performs a depth separable convolution operation on the feature map after the depth-to-time for fine-tuning (step S256).

Figure 7:
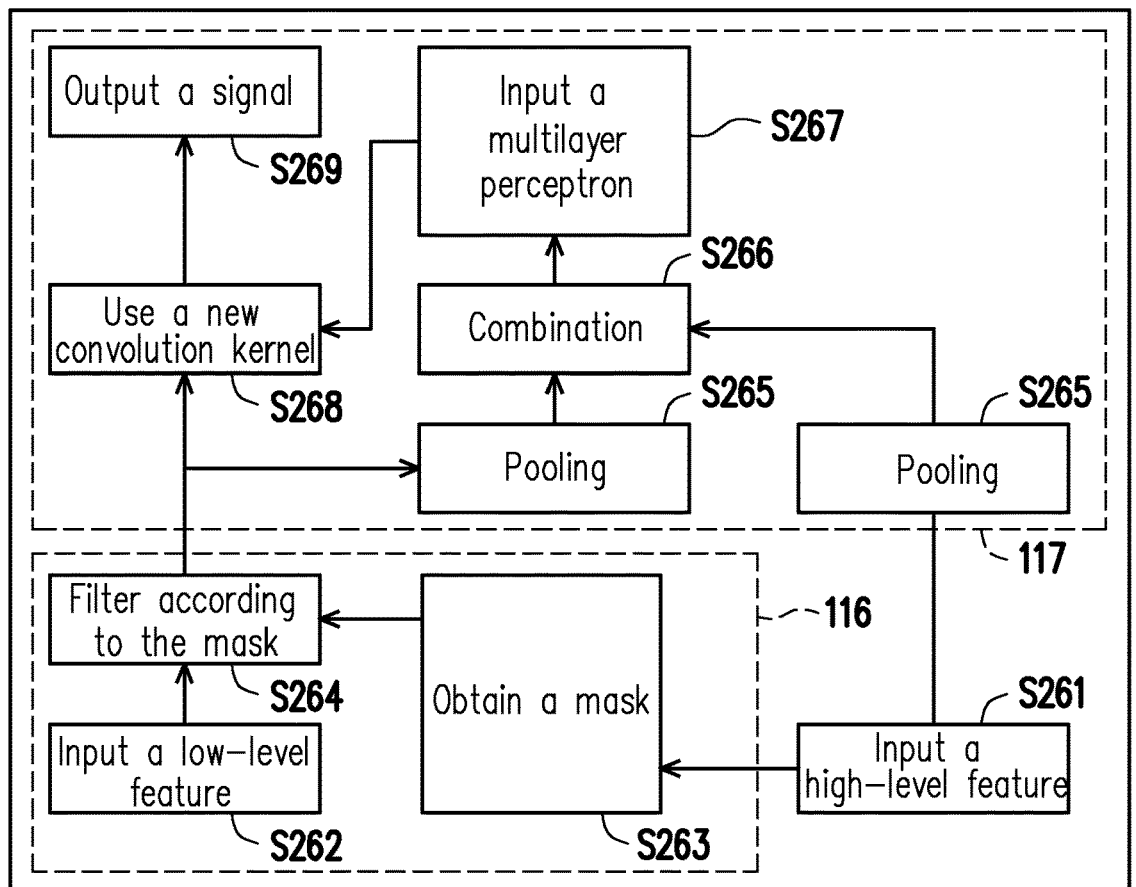
FIG. 7 is a schematic flow chart of an enhancement module according to an embodiment of the disclosure.

In an embodiment, the embodiment of the disclosure improves the result of separation through an enhancement module 115. The enhancement module 115 may perform temporal attention and/or dynamic convolution kernel operations (step S257). FIG. 7 is a schematic flow chart of an enhancement module 115 according to an embodiment of the disclosure. Referring to FIG. 7, the enhancement module 115 sets an input feature of the high level as $X^{HF} \in \mathbb{R}^{L_H \times M_H}$ (input of step S261, the encoded signal output by the encoding block ECB5 of the highest level may be adopted), and sets an input feature of the low level as $X^{LF} \in \mathbb{R}^{L_L \times M_L}$ (input of step S262, the decoded signal output by the decoding block DCB1 of the lowest level may be adopted (via steps S255 and S256)), where $L_L$ and $L_H$ are input lengths, and $M_L$ and $M_H$ are the number of channels. A temporal attention mask $M_T$ may be obtained according to the following formula (4):

$$M_T = \sigma(\text{conv}(X^{HF}, W^M)) \quad (4),$$

where $\sigma$ is a sigmoid function. It is worth noting that at this time, in $M_T \in \mathbb{R}^{L_H \times N_H}$, $N_H$ is the number of output channels after the convolution layer (whose weight is $W^M$), and $N_H = L_L/L_H$. After the mask $M_T$ is rearranged through the depth-to-time conversion, $M_T \in \mathbb{R}^{L_L \times 1}$, and then it is duplicated $M_L$ times along the channel, so that $M_T \in \mathbb{R}^{L_L \times M_L}$ (i.e., obtain a mask) (step S263)). The temporal attention is as follows:

$$\hat{X}^{LF} = M_T \odot X^{LF} \quad (5),$$

where $\odot$ is element-wise multiply, that is, filtering the feature of the low level according to the mask (step S264). The operation is performed because the receptive field of the feature of the high level is wider despite that the details thereof are poor. Based on the feature of the high level, it is possible to identify which parts of the time series are more important in extracting a particular source from a macro perspective, to assign the parts weights closer to 1, and to assign useless or even disturbing parts weights much lower than 1 or even close to 0, thereby reducing the difficulty of subsequent source separation processing.

In another embodiment, for a dynamic convolution kernel, the enhancement module 115 may change the weight of the convolution kernel based on the encoded signal output by the encoding block ECB5 of the highest level and the decoded signal output by the decoding block DCB1 of the lowest level (via steps S255 and S256). Specifically, although the effect of separation can be achieved by projecting features back to a time-domain waveform during pointwise convolution at the final decoding stage, since the weight of the convolution kernel of the pointwise convolution is already fixed when a model is trained, the ability to expand may be limited, particularly when data is limited. Therefore, the embodiment of the disclosure increases the expanding ability of the model through the dynamic convolution kernel.

The input feature $X^{HF}$ of the high level and the feature $\hat{X}^{LF}$ of the low level after applying the temporal attention or the feature $X^{LF}$ of the low level without applying the temporal attention are each subjected to a pooling operation (step S265) to obtain a compression feature $G^{HF} \in \mathbb{R}^{1 \times M_H}$ and $\hat{G}^{LF} \in \mathbb{R}^{1 \times M_L}$ (or $G^{LF} \in \mathbb{R}^{1 \times M_L}$):

$$G^{HF} = GAP(X^{HF}) = \frac{1}{L_H} \sum_{=1}^{L_H} X_j^{HF} \quad (6)$$

$$\hat{G}^{LF} = GAP(\hat{X}^{LF}) = \frac{1}{L_H} \sum_{=1}^{L_H} \hat{X}_j^{LF} \text{ or} \quad (7)$$

$$G^{LF} = GAP(X^{LF}) = \frac{1}{L_H} \sum_{=1}^{L_H} X_j^{LF}, \quad (8)$$

wherein the pooling operation is, for example, a Global Average Pooling (GAP) operation, but the disclosure is not limited thereto. The enhancement module 115 may combine two compression features $G^{HF}$ and $\hat{G}^{LF}$ (or $G^{LF}$) (step S266) (in serial connection, for example) to obtain a compression feature $G \in \mathbb{R}^{1 \times (M_H + M_L)}$) and the compression feature may be input to a multilayer perceptron (step S267) (i.e., serving as the input feature of the multilayer perceptron).

In an embodiment, the multilayer perceptron is composed of two fully connected layers. The first layer is, for example, via an excitation function, and the second layer may be set to perform a combination of operations to obtain a weight $W^O \in \mathbb{R}^{1 \times M_L}$ $$W^O = \varphi(G(W^{f1})^T)(W^{f2})^T \quad (9),$$

where $\varphi$ represents the excitation function; G is the aforementioned compression feature; $W^{f1}$ is the weight of the first fully connected layer (the number of neurons is n, and then $W^{f1} \in \mathbb{R}^{n \times (M_H + M_L)}$); $W^{f2} \in \mathbb{R}^{M_L \times n}$ is the weight of the second fully connected layer, and the number of neurons is $M_L$. By using $W^O$ as the weight of the last layer of pointwise convolution (i.e., using a new convolution kernel (step S268)), a final output result $Y^V \in \mathbb{R}^{L \times 1}$ (i.e., an output signal (step S269)) is obtained:

$$Y^V = PWconv(\hat{X}^{LF}, W^O),$$

where PWconv is pointwise convolution.

It should be noted that according to different design requirements, the user may select either or both of the temporal attention and dynamic convolution kernel operations, and may even directly use the output of step S256 as the final output result. However, the disclosure is not limited thereto. According to the experimental results, the effect of separation achieved by selecting the both operations is the best. Finally, the processor 130 may output a signal (i.e., a signal generated by the source to be separated in the one-dimensional signal) (step S258). For example, the processor 130 may separate a sound signal produced by a violin from the recorded music of an orchestra.

Figure 8:
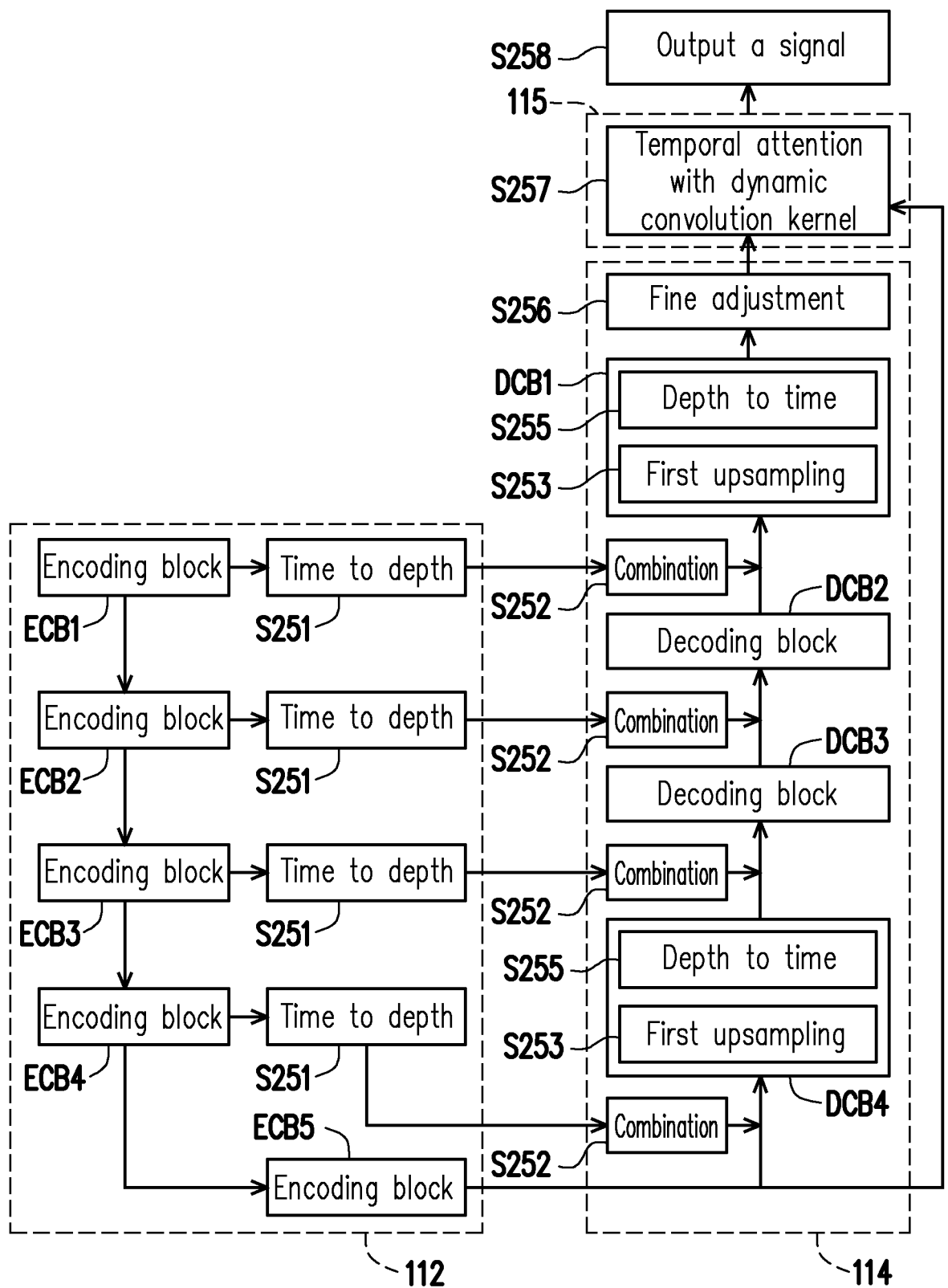
FIG. 8 is a schematic flow chart of an overall framework according to another embodiment of the disclosure.

It should be noted that the framework of FIG. 5 is a receptive field preserving decoder, that is, in the process of upsampling, the time scale remains unchanged, and the final time scale is matched through the depth-to-time conversion at the final stage. An embodiment of the disclosure also provides another framework. FIG. 8 is a schematic flow chart of an overall framework according to another embodiment of the disclosure. Referring to FIG. 8, what differs from the embodiment of FIG. 5 is that during the process of upsampling under the framework of FIG. 8, each time an upsampled decoded block is used, the decoding module 114 improves the time resolution through the depth-to-time conversion (step S255) (reference is made to the decoding blocks DCB1 and DCB4).

It should be noted that the aforementioned source separation method may also be used as a code and recorded in a non-transitory computer-readable medium such as an HDD, a floppy disk, a flash drive, or a CD, and the code may be loaded and executed by any type of processor (e.g., the processor 130).

Based on the above, the source separation method, the apparatus and the non-transitory computer-readable medium of the embodiments of the disclosure adopt the one-dimensional signal as the input, use a multi-scale one-dimensional convolutional neural network as a main framework, and incorporate an end-to-end one-dimensional signal separation neural network framework using ASPP. In the embodiments of the disclosure, the conventional upsampling is replaced with the time-to-depth and depth-to-time conversions, together with the receptive field preserving decoder. Moreover, the embodiments of the disclosure is further provided with the temporal attention with dynamic convolution kernel. Thus, the framework and the number of parameters are simplified and reduced, the effect of separation becomes more favorable under the framework.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A source separation method, suitable for machine learning, the source separation method comprising:
   obtaining a one-dimensional signal, wherein the one-dimensional signal is generated by at least one source;
   encoding the one-dimensional signal in levels to form a plurality of one-dimensional encoded signals, wherein the one-dimensional encoded signal output by an encoding block of each level serves as an input of the encoding block of a next level, and the one-dimensional encoded signals output by the encoding blocks of different levels have different lengths; and
   decoding the one-dimensional encoded signals in levels to obtain a signal generated by at least one source to be separated in the at least one source, wherein
   the one-dimensional encoded signal of a low level is subjected to time-to-depth conversion to form a multi-dimensional signal having the same length as a decoded signal of a high level, the high level corresponding to the encoding block of a next level of the low level, and
   the multi-dimensional signal of the low level and the decoded signal of the high level are combined to preserve a receptive field and perform a decoding operation, the decoded signal being an output or input of the decoding operation,
   wherein forming the multi-dimensional signal comprises:
   equally dividing a channel in the one-dimensional encoded signal of the low level into a plurality of signal groups;
   sequentially combining input features at the same position in the signal groups into a plurality of one-dimensional second encoded signals; and
   combining the second encoded signals to form the multi-dimensional signal.

2. The source separation method according to claim 1, wherein decoding the one-dimensional encoded signals in levels comprises:
   changing, in the decoding block of at least one level, a dimension of the decoded signal of the decoding block of the level through depth-to-time conversion, or
   subjecting the decoded signal output by the decoding block of at least one level to depth-to-time conversion to form a second decoded signal having the same length as the one-dimensional signal.

3. The source separation method according to claim 1, wherein decoding the one-dimensional encoded signals in levels comprises:
   obtaining a mask according to the one-dimensional encoded signal output by the encoding block of a highest level, wherein the mask relates to filtering a time segment in which the at least one source to be separated has no output; and
   filtering, according to the mask, the decoded signal output by the decoding block of a lowest level.

4. The source separation method according to claim 1, wherein decoding the one-dimensional encoded signals in levels comprises:
   changing a weight of a convolution kernel based on the one-dimensional encoded signal output by the encoding block of a highest level and the decoded signal output by the decoding block of a lowest level.

5. The source separation method according to claim 1, wherein encoding the one-dimensional signal in levels to form the one-dimensional encoded signals comprises:
performing, in the encoding block of at least one level, Atrous Spatial Pyramid Pooling (ASPP) processing on each channel in the one-dimensional encoded signal output by the encoding block of a previous level.

6. The source separation method according to claim 1, wherein encoding the one-dimensional signal in levels to form the one-dimensional encoded signals comprises:
performing downsampling processing in the encoding block of at least one level according to a depth separable convolution having a stride greater than one.

7. A source separation apparatus, suitable for machine learning, the source separation apparatus comprising:
a memory, recording at least one code; and
a processor, coupled to the memory, and loading the at least one code to perform:
obtaining a one-dimensional signal, wherein the one-dimensional signal is generated by at least one source;
encoding the one-dimensional signal in levels to form a plurality of one-dimensional encoded signals, wherein the one-dimensional encoded signal output by an encoding block of each level serves as an input of the encoding block of a next level, and the one-dimensional encoded signals output by the encoding blocks of different levels have different lengths; and
decoding the one-dimensional encoded signals in levels to obtain a signal generated by at least one source to be separated in the at least one source, wherein
the one-dimensional encoded signal of a low level is subjected to time-to-depth conversion to form a multi-dimensional signal having the same length as a decoded signal of a high level, the high level corresponding to the encoding block of a next level of the low level, and; and
the multi-dimensional signal of the low level and the decoded signal of the high level are combined to preserve a receptive field and perform a decoding operation, the decoded signal being an output or input of the decoding operation, wherein the processor is further configured to:
equally divide a channel in the one-dimensional encoded signal of the low level into a plurality of signal groups;
sequentially combine input features at the same position in the signal groups into a plurality of one-dimensional second encoded signals; and
combine the second encoded signals to form the multi-dimensional signal.

8. The source separation apparatus according to claim 7, wherein the processor is further configured to:
change, in the decoding block of at least one level, a dimension of the decoded signal of the decoding block of the level through depth-to-time conversion, or
subject the decoded signal output by the decoding block of at least one level to depth-to-time conversion to form a second decoded signal having the same length as the one-dimensional signal.

9. The source separation apparatus according to claim 7, wherein the processor is further configured to:
obtain a mask according to the one-dimensional encoded signal output by the encoding block of a highest level, wherein the mask relates to filtering a time segment in which the at least one source to be separated has no output; and
filter, according to the mask, the decoded signal output by the decoding block of a lowest level.

10. The source separation apparatus according to claim 7, wherein the processor is further configured to:
change a weight of a convolution kernel based on the one-dimensional encoded signal output by the encoding block of a highest level and the decoded signal output by the decoding block of a lowest level.

11. The source separation apparatus according to claim 7, wherein the processor is further configured to:
perform, in the encoding block of at least one level, Atrous Spatial Pyramid Pooling (ASPP) processing on each channel in the one-dimensional encoded signal output by the encoding block of a previous level.

12. The source separation apparatus according to claim 7, wherein the processor is further configured to:
perform downsampling processing in the encoding block of at least one level according to a depth separable convolution having a stride greater than one.

13. A non-transitory computer-readable medium, recording at least one code that is loaded and executed by a processor to perform the source separation method according to claim 1.

* * * * *